US012673343B2

(12) United States Patent
Hozumi et al.

(10) Patent No.: US 12,673,343 B2
(45) Date of Patent: Jul. 7, 2026

(54) COATING DEVICE AND COATING METHOD

(71) Applicant: KYOCERA CORPORATION, Kyoto (JP)

(72) Inventors: Daisuke Hozumi, Kirishima (JP); Kenko Gejima, Kirishima (JP); Ayumu Matsumoto, Kirishima (JP)

(73) Assignee: KYOCERA CORPORATION, Kyoto (JP)

( * ) Notice: Subject to any disclaimer, the term of this patent is extended or adjusted under 35 U.S.C. 154(b) by 436 days.

(21) Appl. No.: 17/631,419

(22) PCT Filed: Jul. 31, 2020

(86) PCT No.: PCT/JP2020/029533
§ 371 (c)(1),
(2) Date: Jan. 28, 2022

(87) PCT Pub. No.: WO2021/020577
PCT Pub. Date: Feb. 4, 2021

(65) Prior Publication Data
US 2022/0274129 A1 Sep. 1, 2022

(30) Foreign Application Priority Data
Jul. 31, 2019 (JP) ................................ 2019-141799

(51) Int. Cl.
*B05C 5/02* (2006.01)
*B05B 3/14* (2006.01)
(Continued)

(52) U.S. Cl.
CPC .................. *B05C 5/02* (2013.01); *B05B 3/14* (2013.01); *B05B 13/0415* (2013.01); *B05D 1/26* (2013.01); *B41J 25/001* (2013.01); *B41J 25/006* (2013.01)

(58) Field of Classification Search
CPC ......... B41J 25/001; B41J 25/006; B05B 3/14; B05B 13/0405–0415
See application file for complete search history.

(56) References Cited

U.S. PATENT DOCUMENTS 4,349,828 A * 9/1982 Fischbeck .............. B41J 25/006 347/39
4,894,262 A * 1/1990 Heitmanek ......... B05B 13/0415 427/393
(Continued)

FOREIGN PATENT DOCUMENTS

CA 2306730 A1 5/1999
CN 1853932 A 11/2006
(Continued)

*Primary Examiner* — Dah-Wei D. Yuan
*Assistant Examiner* — Stephen A Kitt
(74) *Attorney, Agent, or Firm* — HAUPTMAN HAM, LLP

(57) ABSTRACT

A coating device includes a head, an arm, and a controller. The head includes a nozzle surface. The arm holds the head. The controller controls movement of the head via the arm. The controller vibrates the head in a second direction intersecting a first direction, and/or rotationally oscillates along a nozzle surface while moving the head in the first direction along the nozzle surface in a state where the nozzle surface and a to-be-coated object face each other.

14 Claims, 18 Drawing Sheets

(51) Int. Cl.
*B05B 13/04* (2006.01)
*B05D 1/26* (2006.01)
*B41J 25/00* (2006.01)

(56) References Cited

U.S. PATENT DOCUMENTS

| | | | | |
|---|---|---|---|---|
| 2002/0044168 | A1* | 4/2002 | Hashi | B41J 2/16588 347/32 |
| 2002/0105688 | A1 | 8/2002 | Katagami et al. | |
| 2003/0039752 | A1 | 2/2003 | Winiewicz et al. | |
| 2006/0146379 | A1 | 7/2006 | Katagami et al. | |
| 2006/0238565 | A1* | 10/2006 | Jung | B41J 29/393 347/37 |
| 2007/0176953 | A1* | 8/2007 | Han | B41J 25/001 347/14 |
| 2008/0030532 | A1* | 2/2008 | Onoe | B41J 25/001 347/9 |
| 2010/0238218 | A1 | 9/2010 | Matsushita et al. | |
| 2011/0262622 | A1* | 10/2011 | Herre | B41J 3/4073 118/712 |
| 2012/0314003 | A1* | 12/2012 | Kersey | B41J 25/001 347/39 |
| 2013/0257984 | A1* | 10/2013 | Beier | B05B 1/14 347/19 |
| 2015/0042716 | A1 | 2/2015 | Beier et al. | |
| 2017/0217159 | A1* | 8/2017 | Takakusa | B41J 2/2135 |
| 2018/0250955 | A1 | 9/2018 | Herre et al. | |
| 2019/0193421 | A1 | 6/2019 | Herre et al. | |
| 2019/0224968 | A1 | 7/2019 | Schlatterbeck et al. | |

FOREIGN PATENT DOCUMENTS

| | | | |
|---|---|---|---|
| CN | 101837679 | A | 9/2010 |
| CN | 104203584 | A | 12/2014 |
| CN | 109963721 | A | 7/2019 |
| JP | 2002099096 | A | 4/2002 |
| JP | 2002-273868 | A | 9/2002 |
| JP | 2008-036947 | A | 2/2008 |
| JP | 2012506305 | A | 3/2012 |
| JP | 2013202781 | A | 10/2013 |
| JP | 201735693 | A | 2/2017 |
| WO | 9921660 | A1 | 5/1999 |
| WO | 2009004120 | A1 | 1/2009 |
| WO | 2017103868 | A1 | 6/2017 |
| WO | 2018108570 | A1 | 6/2018 |

* cited by examiner

COATING DEVICE AND COATING METHOD

RELATED APPLICATIONS

The present application is a National Phase of International Application Number PCT/JP2020/029533 filed Jul. 31, 2020 and claims priority to Japanese Application Number 2019-141799 filed Jul. 31, 2019.

TECHNICAL FIELD

Disclosed embodiments relate to a coating device and a coating method.

BACKGROUND ART

A coating device using an inkjet method is known. A head for discharging a coating material is mounted on such a coating device of an inkjet method.

CITATION LIST

Patent Literature

Patent Document 1: JP 2013-202781 A
Patent Document 2: JP 2012-506305 T

SUMMARY OF INVENTION

A coating device according to one aspect of an embodiment includes a head, an arm, and a controller. The head includes a nozzle surface. The arm holds the head. The controller controls movement of the head via the arm. The controller vibrates the head in a second direction intersecting a first direction, and/or rotationally oscillates the head along the nozzle surface while moving the head in the first direction along the nozzle surface in a state where the nozzle surface and a to-be-coated object face each other.

DESCRIPTION OF EMBODIMENTS

Embodiments of a coating device and a coating method disclosed in the present application will be described in detail below with reference to the accompanying drawings. Note that the present invention is not limited to the embodiments that will be described below.

Configuration of Coating Device

Figure 1:
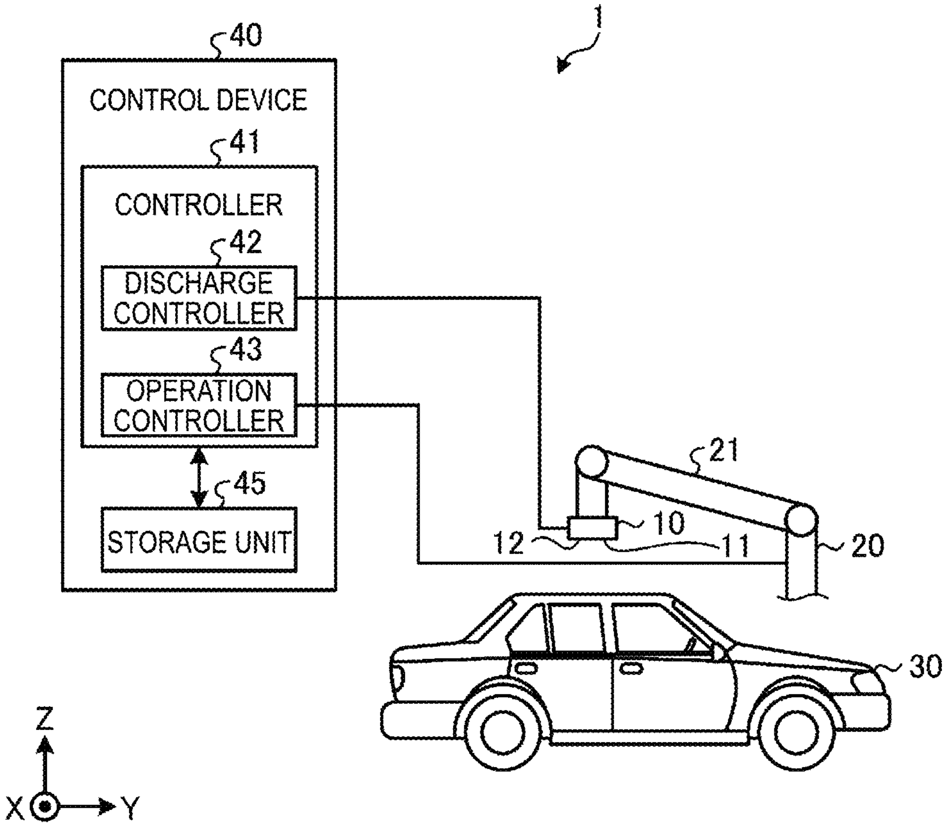
FIG. 1 is an explanatory view of a coating device according to an embodiment.

First, with reference to FIG. 1, a description will be given of an overview of a coating device according to an embodiment. FIG. 1 is an explanatory view of the coating device according to the embodiment.

As illustrated in FIG. 1, a coating device 1 includes a head 10, a robot 20, and a control device 40.

The head 10 is fixed to the robot 20. The head 10 moves in response to movement of the robot 20 controlled by the control device 40. The head 10 can use, for example, an inkjet head of a valve type, a piezo type, or a thermal type. When a piezo type or thermal type inkjet head is used as the head 10, high resolution is easily realized.

The head 10 coats a to-be-coated object 30 by depositing a coating material discharged from a plurality of discharge holes 11 located on a nozzle surface 12 onto a surface of the to-be-coated object 30 facing the nozzle surface 12.

The coating material is supplied to the head 10 from a tank (not illustrated). The head 10 discharges the coating material supplied from the tank. The coating material is a mixture containing a volatile component and a nonvolatile component, and has fluidity. Note that the tank may be a reservoir (not illustrated) housed in the head 10.

The volatile component is, for example, water, organic solvent, or alcohol, and adjusts the physical properties such as viscosity and surface tension of the coating material. The nonvolatile component contains, for example, a pigment, a resin material, and an additive. The pigment includes one or more colored pigments used depending on a desired coating color. The resin material is deposited on the to-be-coated object 30 and forms a film. The additive is a functional material that is added, for example for purposes of weather resistance and the like.

Note that the coating material supplied to the discharge holes 11 is prepared such that a desired coating color is expressed by mixing a plurality of colored pigments or coating materials at predetermined proportions.

The robot 20 holds the head 10. The robot 20 is, for example, a six-axis articulated robot. The robot 20 may be, for example, a vertical articulated robot or a horizontal articulated robot. The robot 20 includes a plurality of arms 21 with the head 10 fixed to a tip of the plurality of arms 21. The robot 20 is fixed to a floor, a wall, a ceiling, or the like.

Note that as long as the held head 10 can be moved properly, there is no limit to the degree of freedom of the arms 21 included in the robot 20.

The control device 40 controls the coating device 1. The control device 40 includes a controller 41 configured to control the coating device 1, and a storage unit 45. The controller 41 includes a discharge controller 42 and an operation controller 43.

The controller 41 includes a computer or various circuits including, for example, a central processing unit (CPU), a read only memory (ROM), a random access memory (RAM), a hard disk drive (HDD), and an input/output port. The CPU of such a computer functions as the controller 41 by, for example, reading and executing the program stored in the ROM. The controller 41 may also be configured by hardware such as an application specific integrated circuit (ASIC) or a field programmable gate array (FPGA). The discharge controller 42 controls the head 10 based on configuration information stored in the storage unit 45, and discharges the coating material from the plurality of discharge holes 11 toward the to-be-coated object 30. The operation controller 43 controls operations of the plurality of arms 21 based on the configuration information stored in the storage unit 45, and controls movement of the head 10 via the arms 21. The distance between the head 10 and the to-be-coated object 30 is maintained at, for example, approximately from 0.5 to 14 mm. The detailed movement of the head 10 will be described later.

The storage unit 45 corresponds to, for example, the ROM and the HDD. The ROM and the HDD can store configuration information for various controls in the control device 40. The storage unit 45 stores information related to discharge control of the coating material by the head 10. Further, the storage unit 45 stores information related to the operation control of the plurality of arms 21. Note that the storage unit 45 may store data input by the user's instruction operation using a terminal apparatus (not illustrated) as instruction data for operating the robot 20. Further, the controller 41 may also acquire the configuration information via another computer or portable storage medium connected by a wired or wireless network.

The to-be-coated object 30 is, for example, a vehicle body. The to-be-coated object 30 is placed on a conveying device (not illustrated), and is carried in and out. The coating device 1 according to an embodiment coats the to-be-coated object 30 in a state where the conveying device is stopped. Note that the coating device 1 may coat the to-be-coated object 30 while the to-be-coated object 30 is being repeatedly conveyed and stopped, or may coat the to-be-coated object 30 while the to-be-coated object 30 is being conveyed.

Figure 2:
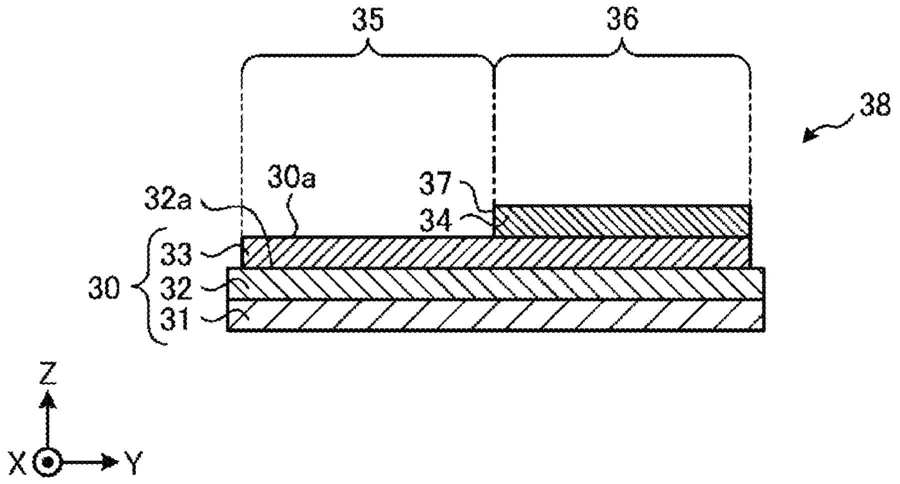
FIG. 2 is a cross-sectional view illustrating an example of a to-be-coated object that was coated.

FIG. 2 is a cross-sectional view illustrating an example of a to-be-coated object that was coated. The to-be-coated object 30 illustrated in FIG. 2 includes a base member 31, a primer layer 32, and a first coating layer 33. The base member 31 is, for example, a steel plate processed into a predetermined shape, and is subjected to an electrodeposition process as necessary to impart rust resistance thereto. The primer layer 32 is provided for imparting weather resistance, color development, and peeling resistance, for example. The first coating layer 33 is, for example, a base layer that has smoothness and weather resistance and imparts a desired coating color. A surface of the first coating layer 33 serves as a to-be-coated surface 30*a* to be coated by the coating device 1 according to the embodiment.

A second coating layer 34 is located on the first coating layer 33 serving as the to-be-coated surface 30*a*. The second coating layer 34 is located so as to cover a portion of the first coating layer 33 with a coating material having a coating color different from that of the first coating layer 33. As a result, the to-be-coated object 30 becomes a coated body 38 that is coated in a so-called two tone color in which a region 36 where the second coating layer 34 is located and a region 35 where the first coating layer 33 is exposed without the second coating layer 34 being located are aligned with an end portion 37 of the second coating layer 34 as a boundary.

In the example illustrated in FIG. 2, the coating device 1 has been described such that the second coating layer 34 is located on the to-be-coated surface 30*a* on the first coating layer 33, but the present invention is not limited thereto, and the coating device 1 may be applied, for example, when the first coating layer 33 is located on a to-be-coated surface 32*a* on the primer layer 32.

Note that the coated body 38 is not limited to the example illustrated in FIG. 2. For example, a coating layer (not illustrated) may be located on the surfaces of the regions 35 and 36. Further, the second coating layer 34 need not be included, and only the first coating layer 33 may be included, and the second coating layer 34 may be located on the entire surface of the first coating layer 33. Further, the to-be-coated object 30 or the coated body 38 may further include one or a plurality of layers (not illustrated).

First Embodiment

Figure 3:
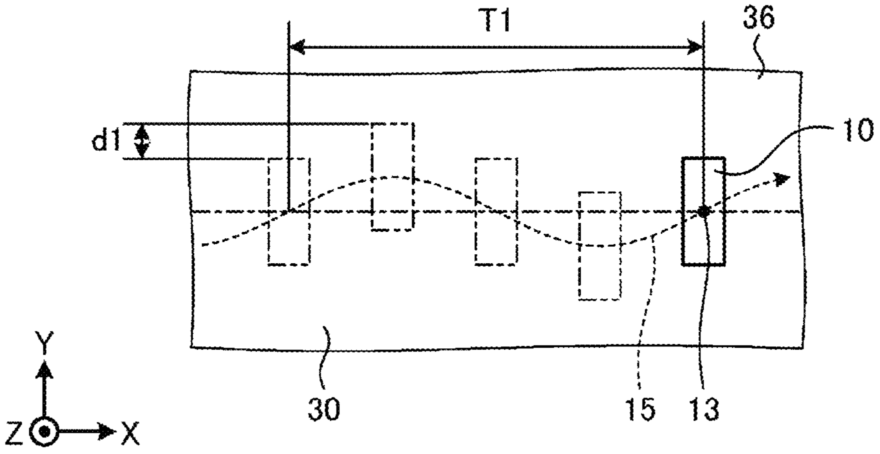
FIG. 3 is a view illustrating an example of a head included in a coating device according to a first embodiment.

FIG. 3 is a view illustrating an example of a head included in a coating device according to a first embodiment. FIG. 3 corresponds to a plan view of the head 10 and the to-be-coated object 30 facing the nozzle surface 12 (see FIG. 1) of the head 10 as viewed from a Z-axis positive direction side. Note that, for ease of explanation, the to-be-coated object 30 has a planar shape along an XY plane, such as a roof of a vehicle body, for example.

Further, in each of the embodiments described below, an example will be given of a case in which the head 10 discharges a coating material that positions the second coating layer 34 in the region 36. Further, the coating device 1 according to each embodiment has a common configuration, except for the movement of the head 10. As a result, other configurations, such as the robot 20 and the control device 40, except for the head 10, are omitted from the drawings.

As illustrated in FIG. 3, the head 10 moves in an X-axis positive direction serving as a first direction in a state of facing the to-be-coated object 30. The head 10 may achieve a surface area coating speed of, for example, 1 $m^2$/min or more and 5 $m^2$/min or less. In order to achieve such a surface area coating speed, assuming the length of the coating region of the head 10 is 100 mm, the head 10 may move in the X-axis direction at a predetermined speed of, for example, $1.67\times10^2$ mm/s or more and $41.67\times10^2$ mm/s or less. Note that, in this example, one head 10 is used; however, the coating device 1 may use two or more heads 10.

The resolution of the head 10 can be, for example, 150 dots per inch (dpi) or more. More preferably, the resolution of the head 10 is 300 dpi or more. When the resolution of the head 10 is 150 dpi or more, the leveling property is improved and the quality of the coating film is improved. Note that the resolution of the head 10 need not necessarily be 150 dpi or more.

Further, the head 10 vibrates in a Y-axis direction serving as a second direction along the XY plane in parallel with the movement in the X-axis positive direction. As a result, the head 10 moves such that a locus 15 of a center 13 in plan view draws a sinusoidal waveform.

By the head 10 moving in the first direction while vibrating in the second direction in this way, even in a case where a gap between the discharge drops increases due to, for example, clogging of a portion of the discharge holes 11 (see FIG. 1), the discharge drops discharged from the discharge holes 11 located near the clogged discharge holes 11 can fill the gap. Thus, with the coating device 1 according to the present embodiment, the coating quality can be improved.

Here, a spatial displacement d1 in the Y-axis direction due to the vibration of the head 10 can be 2 mm or less, for example, 0.07 mm or more and 2 mm or less. Accordingly, the gap between the discharge drops is easily filled.

Further, a vibration period T1 of the head 10 can be 2 mm or less, for example, 0.07 mm or more and 2 mm or less. By defining the vibration period T1 in this manner, the gap between the discharge drops is easily filled.

Further, a lower limit of the spatial displacement d1 of the head 10 may be set based on an interval of the discharge holes 11 (see FIG. 1) arranged in the second direction intersecting the movement direction of the head 10. This point will be described with reference to FIG. 4.

Figure 4A:
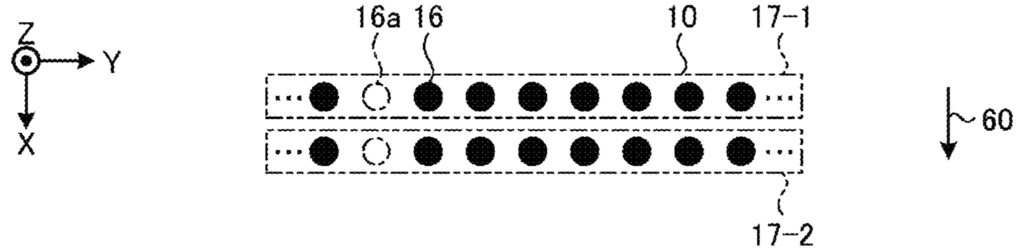
FIG. 4A is an enlarged view comparing an array of discharge drops discharged onto a to-be-coated object.
Figure 4B:
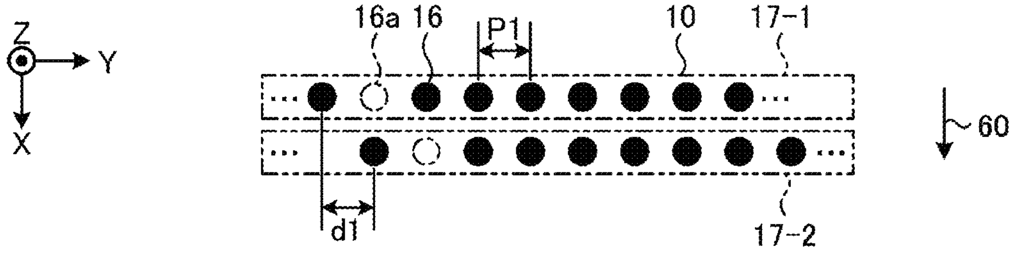
FIG. 4B is an enlarged view comparing an array of discharge drops discharged onto a to-be-coated object.
Figure 4C:
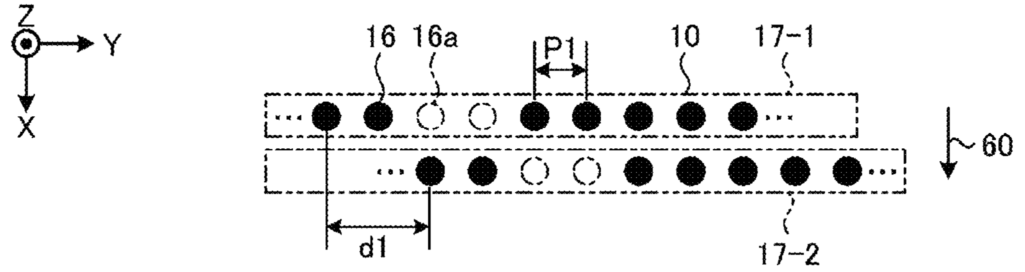
FIG. 4C is an enlarged view comparing an array of discharge drops discharged onto a to-be-coated object.

FIGS. 4A to 4C are enlarged views comparing arrays of discharge drops discharged onto the to-be-coated object. For ease of illustration, each head 10 is illustrated as a head 10 including only one column (also referred to as a "row") of discharge holes 11 aligned in the Y-axis direction intersecting a movement direction 60 of each head 10. In the head 10, at a point 17-1 and a point 17-2 adjacent to the point 17-1, each portion where the coating material is discharged from the discharge hole 11 is illustrated as a discharge portion 16 (one example of a discharge drop), and each portion where the discharge portion 16 is intended to be located, but the coating material is not discharged, is illustrated as a non-discharge portion 16*a*.

As illustrated in FIG. 4A, in a case where the head 10 does not vibrate in the Y-axis direction, the non-discharge portions 16*a* are continuous along the movement direction 60 of the head 10. As a result, the non-discharge portions 16*a* are easily visually recognized as a coating streak.

On the other hand, as illustrated in FIG. 4B, by making the spatial displacement d1 of the head 10 equal to or more than an interval P1 between adjacent ones of the discharge portions 16 in the Y-axis direction, in other words, an interval between the discharge holes 11, the non-discharge portions 16*a* become discontinuous. As a result, the non-discharge portions 16*a* are less likely to be visually recognized as a coating streak, and the coating quality is improved. In particular, as illustrated in FIG. 4C, in a case where the spatial displacement d1 of the head 10 is two times or more of the interval P1 between adjacent ones of the discharge portions 16 in the Y-axis direction, in other words, the interval between the discharge holes 11, even when the non-discharge portions 16*a* are located side by side in the Y-axis direction as illustrated, the non-discharge portions 16*a* are less likely to be visually recognized, and the coating quality is improved.

Note that as the vibration of the head 10 in the present embodiment, the case where the vibration is performed by the predetermined spatial displacement d1 in the second direction (Y-axis direction) serving as a direction orthogonal to the first direction (X-axis direction) is exemplified, but the present invention is not limited thereto. For example, the head 10 may vibrate in a direction intersecting the first direction. Furthermore, the head 10 may vibrate in the second direction and alternately vibrate in the direction intersecting the first direction, or may vibrate in a random direction. In this case as well, the non-discharge portions 16*a* are less likely to be visually recognized, and the coating quality is improved. Further, the head 10 may vibrate in the Z-axis direction. In this case, for example, the size of the discharge drop can be changed, and the coating quality is improved.

Second Embodiment

Figure 5:
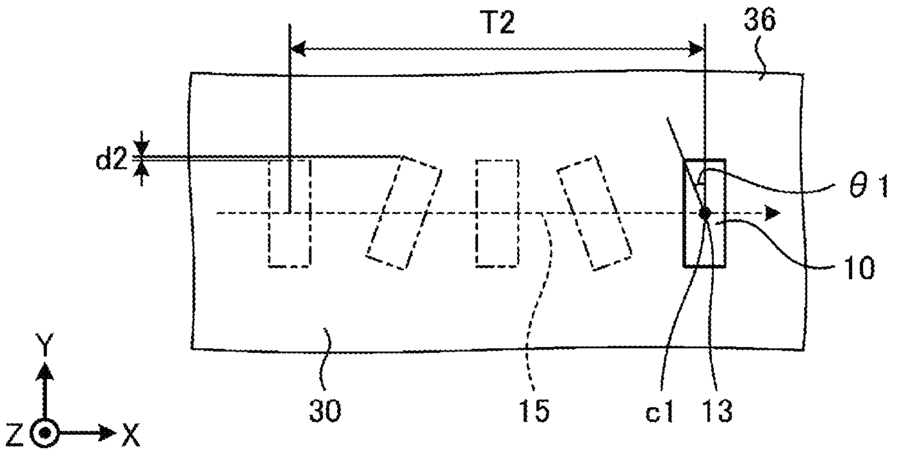
FIG. 5 is a view illustrating an example of a head included in a coating device according to a second embodiment.

FIG. 5 is a view illustrating an example of a head included in a coating device according to a second embodiment. The head 10 illustrated in FIG. 5 rotationally oscillates along the XY plane around an oscillation axis c1 along the Z-axis through the center 13, in parallel with the movement in the X-axis positive direction.

By the head 10 moving in the first direction while rotationally oscillating in this way, even in a case where the gap between the discharge drops increases due to, for example, the clogging of a portion of the discharge holes 11 (see FIG. 1), the discharge drops discharged from the discharge holes 11 located near the clogged discharge holes 11 can fill the gap.

Here, a spatial displacement d2 in the Y-axis direction due to the rotational oscillation of the head 10 can be 2 mm or less, for example, 0.07 mm or more and 2 mm or less. Accordingly, the gap between the discharge drops is easily filled. Note that an oscillation angle θ1 can be set according to, for example, the array of the discharge holes 11 in the head 10 as illustrated in FIG. 6.

Figure 6:
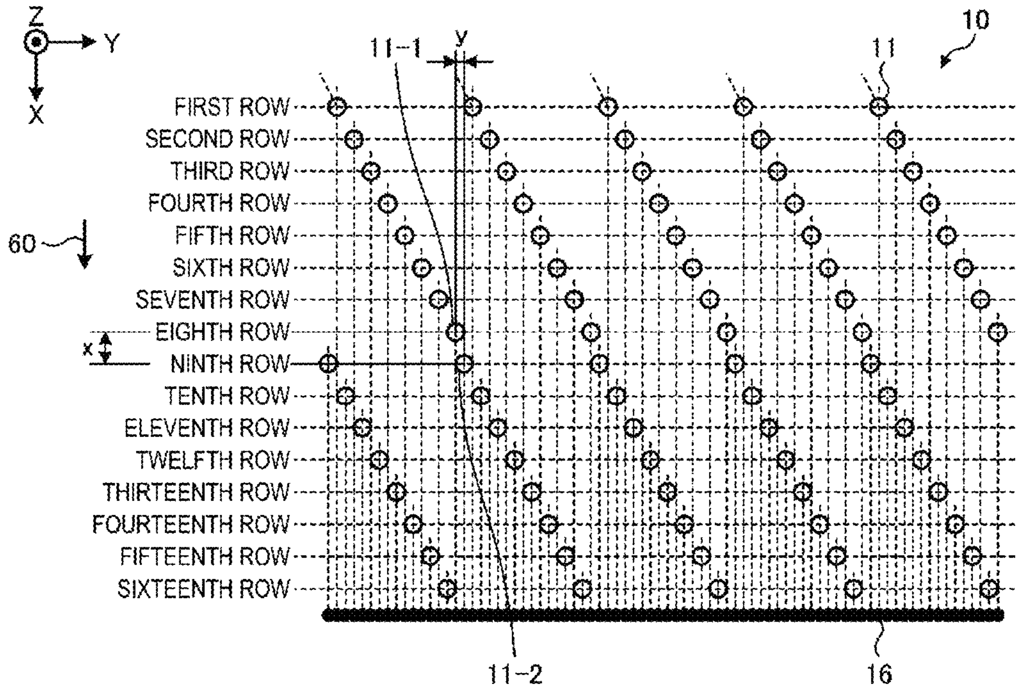
FIG. 6 is a view illustrating an array of discharge holes in a head included in a coating device according to an embodiment.

FIG. 6 is a view illustrating an array of the discharge holes in the head included in the coating device according to the embodiment. The head 10 illustrated in FIG. 6 corresponds to a perspective of the array of the discharge holes 11 from the Z-axis positive direction side.

In the head 10 illustrated in FIG. 6, the discharge holes 11 are aligned along the Y-axis direction, while the discharge holes 11 are located offset in the X-axis direction. The head 10 does not simultaneously discharge the coating material from all the discharge holes 11, but discharges the coating material for each "row" aligned in the Y-axis direction at a timing when the head 10 reaches a predetermined position while moving the head 10 in the movement direction 60. As a result, the discharge portions 16 can be located at an interval narrower than the interval between the discharge holes 11 aligned on the XY plane.

Here, the oscillation angle θ1 (see FIG. 5) can be set based on the combination in which the distance in the movement direction 60 is closest among the discharge holes 11 forming adjacent discharge drops. In the head 10 illustrated in FIG. 6, assuming distances in the X-axis direction and the Y-axis direction are x and y, respectively, in the discharge holes 11-1 and 11-2, the oscillation angle θ1 (°) is defined so as to be $\tan\theta 1 \geq y/x$. As a result, even when a portion of the discharge holes 11 is clogged, the discharge drops discharged from the discharge holes 11 located near the clogged discharge holes 11 can cover the gap. The oscillation angle θ1 can be, for example, from 0.2° to 5°.

Further, an oscillation period T2 (see FIG. 5) of the head 10 can be 2 mm or less, for example, 0.07 mm or more and 2 mm or less. By defining the oscillation period T2 in this manner, the gap between the discharge drops is easily filled.

Note that as the rotational oscillation in the present embodiment, the case where the head 10 performs the rotational oscillation on the XY plane at the oscillation angle θ1 around the oscillation axis c1 is exemplified, but the present invention is not limited thereto. The head 10 may include a plurality of different oscillation axes c1 and may rotationally oscillate randomly.

Note that the oscillation axis c1 may be located at a position offset from the center 13 along the X-axis. Further, the oscillation axis c1 may be located at a position offset in the X-axis direction from the center 13. This point will be described with reference to FIG. 7.

Figure 7:
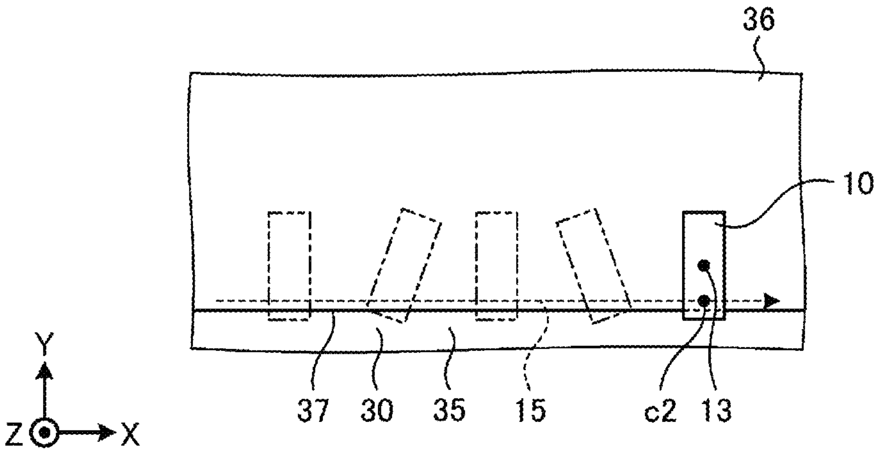
FIG. 7 is a view illustrating an example of a head included in a coating device according to a variation of the second embodiment.

FIG. 7 is a view illustrating an example of a head included in a coating device according to a variation of a second embodiment. The head 10 illustrated in FIG. 7 rotationally oscillates around an oscillation axis c2 offset from the center 13 to the Y-axis negative direction side. In the rotationally oscillating head 10, a centrifugal force is applied to the coating material discharged from the head 10 in accordance with a distance from the oscillation axis c2. Thus, the discharge drops discharged from the discharge holes 11 (see FIG. 1) located remote from the oscillation axis c2 may have a distorted shape. In contrast, from the discharge holes 11 located at a location close to the oscillation axis c2, discharge drops having the desired shape are easily discharged. Thus, when the head 10 is moved along the X-axis direction while being rotationally oscillated around the oscillation axis c2 near an end portion 37 with the region 35, a boundary of the regions 35 and 36 becomes sharp, and the appearance is improved.

As described above, by moving the head 10 in the first direction along the nozzle surface 12 while vibrating or rotationally oscillating the head 10 along the nozzle surface 12, in a state in which the nozzle surface 12 and the to-be-coated object 30 face each other, the clogging of the discharge holes 11 is covered and the coating quality is improved. However, sufficient coating quality may not necessarily be obtained only by vibrating or rotationally oscillating the head 10. This point will be described with reference to FIGS. 8A to 8C.

Figure 8A:
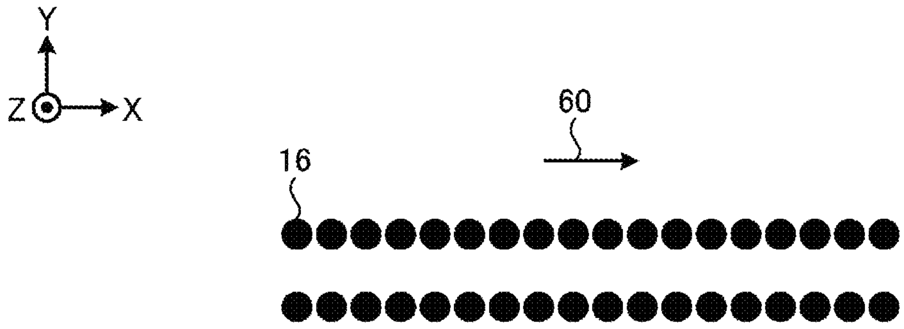
FIG. 8A is an enlarged view comparing discharge drops discharged onto a to-be-coated object.
Figure 8B:
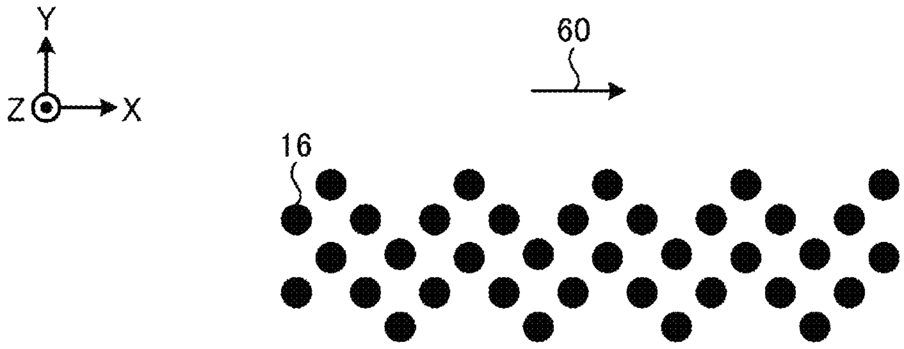
FIG. 8B is an enlarged view comparing discharge drops discharged onto a to-be-coated object.
Figure 8C:
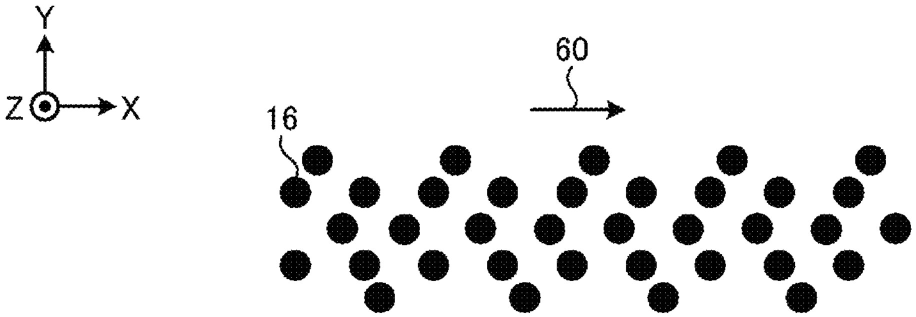
FIG. 8C is an enlarged view comparing discharge drops discharged onto a to-be-coated object.

FIGS. 8A to 8C are enlarged views comparing the arrays of discharge drops discharged onto the to-be-coated object. For ease of illustration, arrays of the coating drops discharged from two discharge holes 11 aligned in the Y-axis direction intersecting the movement direction 60 of the head 10 are illustrated as the discharge portions 16. Further, a case where the head 10 does not vibrate or rotationally oscillate is illustrated in FIG. 8A, a case where the head 10 vibrates is illustrated in FIG. 8B, and a case where the head 10 rotationally oscillates is illustrated in FIG. 8C.

As illustrated in FIG. 8A, in the case where the head 10 does not vibrate or rotationally oscillate in the Y-axis direction, the intervals between adjacent ones of the discharge portions 16 are continuous so as to be along the movement direction 60 of the head 10, and the intervals are easily visually recognized as a coating streak.

On the other hand, as illustrated in FIGS. 8B and 8C, in the case where the head 10 vibrates or rotationally oscillates in the Y-axis direction, the intervals between the discharge portions 16 along the movement direction 60 become irregular. as a result, the intervals are less likely to be visually recognized as a coating streak. On the other hand, when the intervals between the discharge portions 16 located at an angle with respect to the movement direction 60 are regular due to the vibration of the head 10, the intervals may be visually recognized as a coating streak. In such a case, as will be described below, a countermeasure can be taken by making the vibration or the rotational oscillation of the head 10 into a complex motion.

Third Embodiment

Figure 9:
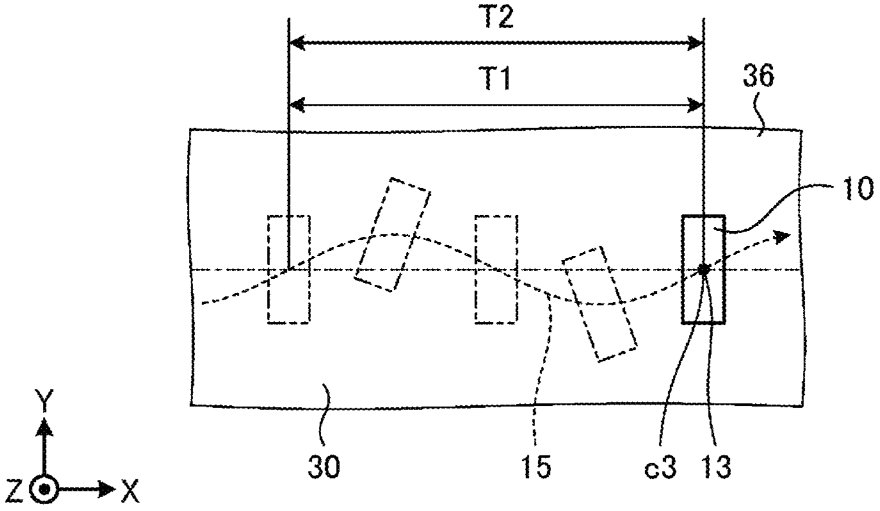
FIG. 9 is a view illustrating an example of a head included in a coating device according to a third embodiment.

FIG. 9 is a view illustrating an example of a head included in a coating device according to a third embodiment. The head 10 illustrated in FIG. 9 simultaneously performs the vibration described in the first embodiment and the rotational oscillation described in the second embodiment in parallel with the movement in the X-axis positive direction.

By the head 10 moving in the first direction while vibrating and rotationally oscillating in this manner, the discharge drops discharged from the discharge holes 11 located near the clogged discharge holes 11 can cover the gap, and the regularity of the discharge drops is degraded, and a coating streak is less likely to be visually recognized. Thus, with the head 10 included in the coating device 1 according to the third embodiment, the coating quality can be improved.

Further, when the head 10 illustrated in FIG. 9 vibrates and rotationally oscillates so as to maximize an inclination with respect to the Y-axis direction, in other words the oscillation angle, when the amount of movement in the Y-axis direction is maximized, the clogging of the discharge holes 11 is easily covered, and the coating quality is improved.

Note that in FIG. 9, the vibration period T1 (see FIG. 3) and the oscillation period T2 (see FIG. 5) are the same, but the present invention is not limited thereto and may be different. By making the vibration period T1 serving as the period of vibration and the oscillation period T2 serving as the period of the rotational oscillation different from each other in this manner, a coating streak is less likely to be visually recognized, and the coating quality is improved.

The head 10 illustrated in FIG. 9 is illustrated as including an oscillation axis c3 overlapping with the center 13 of the head 10, but the present invention is not limited thereto. The oscillation axis c3 may be located at a position offset from the center 13 along the X-axis. Further, the oscillation axis c3 may be located at a position offset in the X-axis direction from the center 13.

Fourth Embodiment

Figure 10:
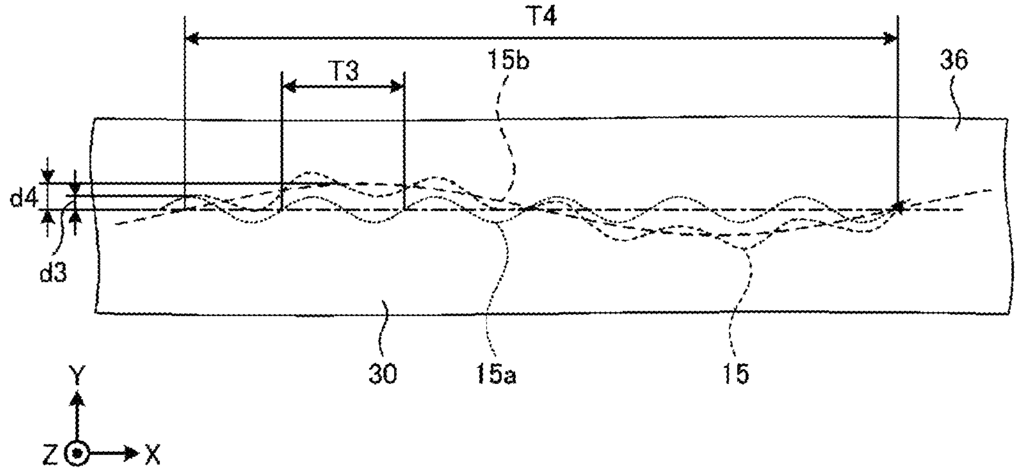
FIG. 10 is a view illustrating an example of a head included in a coating device according to a fourth embodiment.

FIG. 10 is a view illustrating an example of a head included in a coating device according to a fourth embodiment. The head 10 illustrated in FIG. 10 simultaneously performs vibrations having different periods in parallel with the movement in the X-axis positive direction. Note that in FIG. 10, illustration of the head 10 is omitted.

As illustrated in FIG. 10, the center 13 of the head 10 moves along the locus 15. The locus 15 is a composite of a locus 15*a* of a first vibration having a spatial displacement d3 and a vibration period T3, and a locus 15*b* of a second vibration having a spatial displacement d4 and a vibration period T4.

By the head 10 moving in the first direction while simultaneously performing the vibrations having different periods in this manner, the discharge drops discharged from the discharge holes 11 located near the clogged discharge holes 11 can cover the gap, and a coating streak is less likely to be visually recognized. Thus, with the head 10 included in the coating device 1 according to the fourth embodiment, the coating quality can be improved.

Here, the spatial displacement d3 in the Y-axis direction due to the first vibration of the head 10 can be 2 mm or less, for example, 0.07 mm or more and 2 mm or less. Accordingly, the gap between the discharge drops is easily filled. Further, the spatial displacement d4 in the Y-axis direction due to the second vibration of the head 10 can be 2 mm or less, for example, 0.07 mm or more and 2 mm or less. Accordingly, the gap between the discharge drops is easily filled. Note that the spatial displacements d3 and d4 may be the same as or different from each other.

Further, the vibration period T3 due to the first vibration of the head 10 can be 2 mm or less, for example, 0.07 mm or more and 2 mm or less. By defining the vibration period T3 in this manner, the gap between the discharge drops is easily filled. Further, the vibration period T4 due to the second vibration of the head 10 can be 100 mm or more, for example, 100 mm or more and 500 mm or less. By defining the vibration period T4 of the head 10 in this manner, the coating streak is less likely to be visually recognized.

Fifth Embodiment

Figure 11:
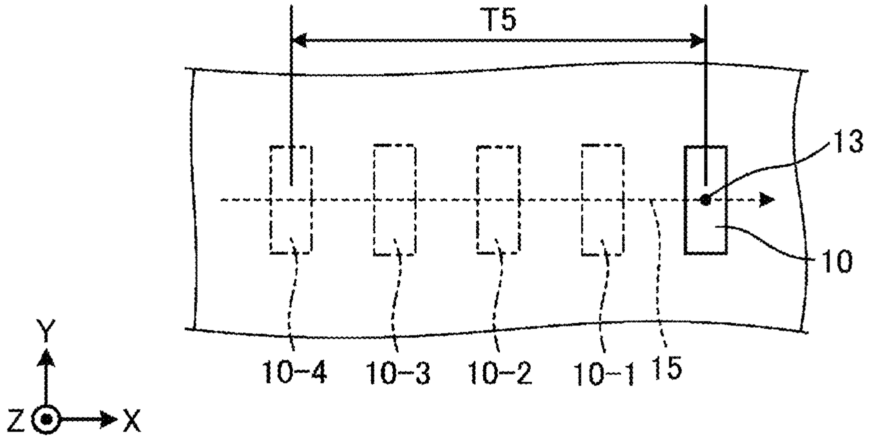
FIG. 11 is a view illustrating an example of a head included in a coating device according to a fifth embodiment.
Figure 12:
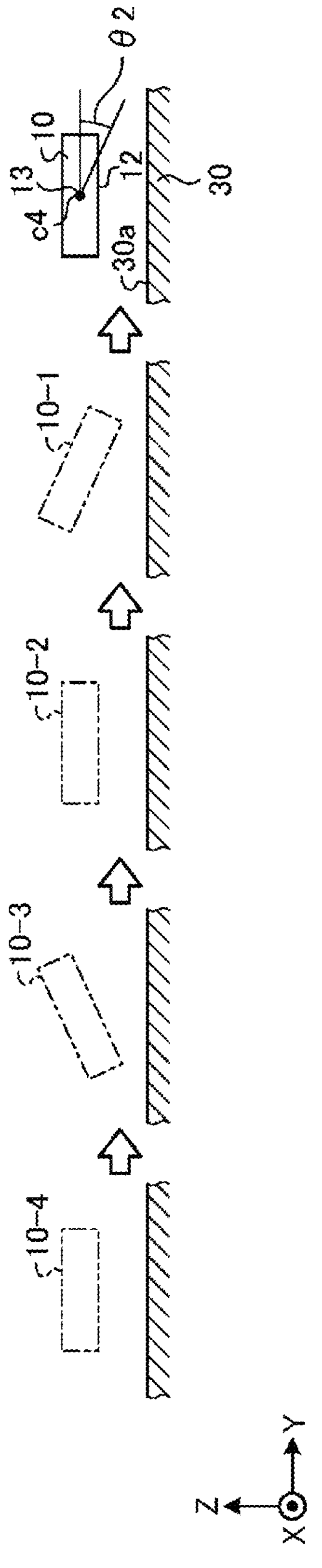
FIG. 12 is a view illustrating an example of a head included in a coating device according to the fifth embodiment.

FIGS. 11 and 12 are views illustrating an example of a head included in a coating device according to a fifth embodiment. In the head 10 according to the present embodiment, the center 13 of the head 10 moves along the X-axis direction serving as the first direction along the to-be-coated surface 30*a* of the to-be-coated object 30, and specifically along the locus 15 extending on the X-axis positive direction side.

FIG. 11 corresponds to a plan view as the head 10 viewed from the Z-axis positive direction. FIG. 12 corresponds to front views of the head 10 at each position (positions 10-4 to 10-1) of the head 10 illustrated in FIG. 11 as respectively viewed from the X-axis positive direction in which the head 10 moves.

As illustrated in FIG. 12, the head 10 rotationally oscillates along a YZ plane around an oscillation axis c4 along the X-axis direction through the center 13, in parallel with the X-axis direction serving as the first direction.

By the head 10 rotationally oscillating around the oscillation axis along the first direction while moving in the first direction in this way, for example, the coating material in the nozzle is vibrated, making the coating material difficult to dry in the nozzle.

Here, a vibration period T5 of the head 10 can be 2 mm or less, for example, 0.07 mm or more and 2 mm or less. By defining the vibration period T5 in this manner, the gap between the discharge drops is easily filled.

Further, an oscillation angle θ2 can be set according to, for example, the array of the discharge holes 11 (see FIG. 1) in the head 10. Specifically, in a case where the discharge holes 11 of the head 10 are arranged as illustrated in FIG. 6, the oscillation angle θ2 (°) of the head 10 can be defined, for example, such that θ2>y/x. As a result, even when a portion of the discharge holes 11 is clogged, the discharge drops discharged from the discharge holes 11 located near the clogged discharge holes 11 can cover the gap. The oscillation angle θ2 can be, for example, from 0.2° to 5°.

Sixth Embodiment

Figure 13:
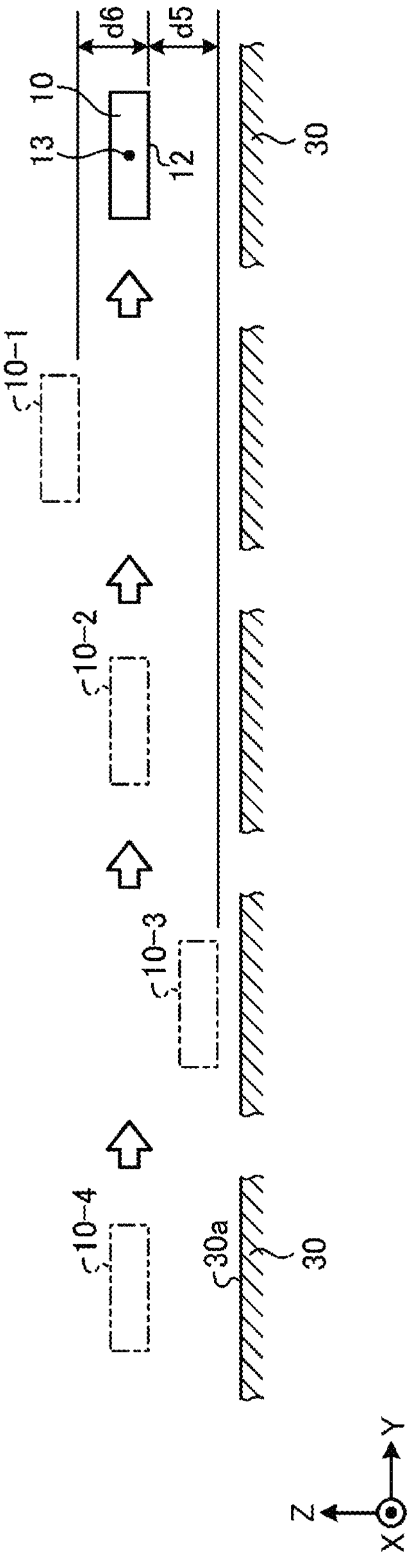
FIG. 13 is a view illustrating an example of a head included in a coating device according to a six embodiment.

FIG. 13 is a view illustrating an example of a head included in a coating device according to a sixth embodiment. The head 10 according to the present embodiment differs from the head 10 included in the coating device 1 according to the fifth embodiment in that the head 10 vibrates in the Z-axis direction serving as a third direction such that an interval between the nozzle surface 12 and the to-be-coated surface 30*a* of the to-be-coated object 30 changes instead of rotational oscillation around the oscillation axis c4.

Figure 14:
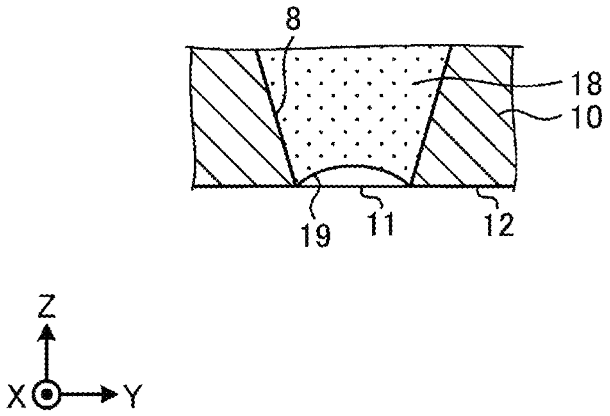
FIG. 14 is a view illustrating an example of a coating material remaining in an interior channel of a head.

FIG. 14 is a view illustrating an example of a coating material remaining in an interior channel of the head. As illustrated in FIG. 14, a nozzle 8 located inside the head 10 supplies a coating material 18 to the discharge hole 11 located on the nozzle surface 12. By the head 10 vibrating in the Z-axis direction, a liquid surface 19 of the coating material 18 also moves in the Z-axis direction.

By the head 10 oscillating in the Z-axis direction serving as the third direction while moving in the X-axis direction serving as the first direction in this manner, for example, the coating material 18 in the nozzle 8 is vibrated, making the coating material 18 difficult to dry in the nozzle 8. As a result, clogging of the discharge hole 11 can be reduced.

Hear, the vibration period of the head 10 can be 2 mm or less, for example, 0.07 mm or more and 2 mm or less. By defining the vibration period in this manner, the gap between the discharge drops is easily filled.

Further, each of a spatial displacements d5 and d6 in the Z-axis direction due to the vibration of the head 10 can be 1 mm or less, for example, 0.07 mm or more and 1 mm or less. As a result, the coating unevenness can be reduced. Note that the spatial displacements d5 and d6 may be the same as or different from each other.

Note that the vibration of the head 10 in the Z-axis direction according to the present embodiment can be performed in combination with the vibration and oscillation of the head 10 according to another embodiment within a range in which no contradiction occurs in the processing content.

Each embodiment according to the present invention was described above. However, the present invention is not limited to the embodiments described above, and various modifications can be made without departing from the essential spirit of the present invention. For example, in the embodiments described above, the coating device 1 including the head 10 configured to discharge a single color coating material was described. However, for example, robots 20 respectively holding heads 10 for discharging basic coating materials such as magenta (M), yellow (Y), cyan (C), and black (K) may be included.

As described above, the coating device according to each of the embodiments includes the head, the arm, and the controller. The head includes the nozzle surface. The arm holds the head. The controller controls movement of the head via the arm. The controller vibrates the head in the second direction intersecting with the first direction, and/or rotationally oscillates along the nozzle surface while moving the head in the first direction along the nozzle surface in a state where the nozzle surface and the to-be-coated object face each other. As a result, the clogging of the discharge holes 11 can be covered and the coating quality is improved.

Further, in the coating device according to the embodiments, the nozzle surface includes the plurality of discharge holes configured to discharge the coating material, and the head vibrates and/or rotationally oscillates with a width equal to or more than the interval between adjacent ones of the discharge holes in the second direction intersecting the first direction. As a result, the clogging of the discharge holes 11 is easily covered and the coating quality is improved.

Further, in the coating device according to the embodiments, the nozzle surface includes the plurality of discharge holes for discharging the coating material, and the head vibrates and/or rotationally oscillates with a width equal to or more than two times of the interval between adjacent ones of the discharge holes in the second direction intersecting the first direction. As a result, the clogging of the discharge holes 11 is easily covered and the coating quality is improved.

Further, in the coating device according to an embodiment, the head rotationally oscillates along the nozzle surface while vibrating in the second direction intersecting the first direction. As a result, the regularity of the discharge drops is degraded, a coating streak is less likely to be visually recognized, and the coating quality is improved.

Further, in the coating device according to the embodiments, the head rotationally oscillates such that the inclination with respect to the second direction is maximum when the spatial displacement in the second direction is maximum. As a result, the clogging of the discharge holes 11 is easily covered and the coating quality is improved.

Further, in the coating device according to the embodiments, in the head, the period of vibration and the period of rotational oscillation are different from each other. As a result, a coating streak is less likely to be visually recognized, and the coating quality is improved.

Further, in the coating device according to the embodiments, the head rotationally oscillates around the axis closer to an end portion of the coating region than a center in a plan view. As a result, the appearance of the end portion of the coating region is improved, and the coating quality is improved.

Further, in the coating device according to the embodiments, the head moves in the second direction at a period different from a period of vibration while vibrating in the second direction intersecting the first direction. As a result, a coating streak is less likely to be visually recognized, and the coating quality is improved.

Further, the coating device according to the embodiments includes the head, the arm, and the controller. The head includes the nozzle surface. The arm holds the head. The controller controls movement of the head via the arm. The controller rotationally oscillates the head around the oscillation axis along the first direction while moving the head in the first direction along the to-be-coated surface of the to-be-coated object in a state where the nozzle surface and the to-be-coated object face each other. As a result, the clogging of the discharge holes 11 can be reduced and the coating quality is improved.

Further, in the coating device according to the embodiments, the head vibrates in the third direction intersecting the first direction so as to change the interval between the nozzle surface and the to-be-coated object. As a result, the clogging of the discharge holes 11 can be reduced and the coating quality is improved.

Additional effects and variations can be easily derived by a person skilled in the art. Thus, a wide variety of aspects of the present invention are not limited to the specific details and representative embodiments represented and described above. Accordingly, various changes are possible without departing from the spirit or scope of the general inventive concepts defined by the appended claims and their equivalents.

The invention claimed is:

1. A coating device comprising:

a head comprising a planar nozzle surface;

an arm configured to hold the head; and a controller configured to control movement of the head via the arm, wherein the controller is configured to rotationally oscillate the head about a second direction perpendicular to the nozzle surface when the nozzle surface is parallel to a planar surface of a to-be-coated object while moving the head in a first direction parallel to the planar surface of the to-be-coated object, wherein the controller is further configured to vibrate the head in the second direction while moving the head in the first direction parallel to the planar surface of the to-be-coated object, and wherein the head rotationally oscillates about the second direction while vibrating in the second direction.

2. The coating device according to claim 1, wherein the nozzle surface comprises a plurality of discharge holes configured to discharge a coating material, and the head rotationally oscillates with a width equal to or more greater than an interval between adjacent discharge holes of the plurality of discharge holes in the second direction perpendicular to the nozzle surface.

3. The coating device according to claim 1, wherein the nozzle surface comprises a plurality of discharge holes configured to discharge a coating material, and the head rotationally oscillates with two times or more of an interval between adjacent discharge holes of the plurality of discharge holes in the second direction perpendicular to the nozzle surface.

4. The coating device according to claim 1, wherein the head rotationally oscillates in the second direction perpendicular to the nozzle surface with a width of 2 mm or less.

5. The coating device according to claim 1, wherein the head rotationally oscillates with a period such that a spatial displacement in the first direction is 2 mm or less.

6. The coating device according to claim 1, wherein the head rotationally oscillates such that an inclination with respect to the second direction is maximum when a spatial displacement in the second direction is maximum.

7. The coating device according to claim 1, wherein a period that the head vibrates is different than a period that the head rotationally oscillates.

8. The coating device according to claim 1, wherein the head rotationally oscillates around an axis closer to an end portion of a coating region than a center axis of the coating region in a plan view.

9. The coating device according to claim 1, wherein a period that the head moves in the second direction is different than a period that the head rotationally oscillates about the second direction perpendicular to the nozzle surface.

10. The coating device according to claim 1, wherein the arm rotationally oscillates the head along the nozzle surface while moving the head in the first direction.

11. The coating device according to claim 1, wherein a resolution of the head is 150 dpi or more.

12. The coating device according to claim 1, wherein the head rotationally oscillates according to a period.

13. A coating device comprising a head comprising a planar nozzle surface;

an arm configured to hold the head; and a controller configured to control movement of the head via the arm, wherein the controller is configured to rotationally oscillate the head about a second direction perpendicular to the nozzle surface when the nozzle surface is parallel to a planar surface of a to-be-coated object while moving the head in a first direction parallel to the planar surface of the to-be-coated object, wherein the controller is further configured to vibrate the head in a third direction parallel to a planar surface of the to-be-coated object while moving the head in the first direction parallel to the planar surface of the to-be-coated object and perpendicular to the third direction.

14. A coating device comprising a head comprising a planar nozzle surface;

an arm configured to hold the head; and a controller configured to control movement of the head via the arm, wherein the controller is configured to rotationally oscillate the head about a second direction perpendicular to the nozzle surface when the nozzle surface is parallel to a planar surface of a to-be-coated object while moving the head in a first direction parallel to the planar surface of the to-be-coated object, wherein the controller is further configured to vibrate the head in a third direction perpendicular to the first direction and changes an interval between the nozzle surface and the to-be-coated object.

* * * * *